(12) United States Patent
McMurray et al.

(10) Patent No.: US 10,842,339 B2
(45) Date of Patent: Nov. 24, 2020

(54) WATER EXTRACTION AND DRYING DEVICE FOR AUTOMOBILE COMPONENTS

(71) Applicants: Harvey Lee McMurray, Durham, NC (US); Harvey Lee McMurray, Jr., Los Angeles, CA (US)

(72) Inventors: Harvey Lee McMurray, Durham, NC (US); Harvey Lee McMurray, Jr., Los Angeles, CA (US)

( * ) Notice: Subject to any disclaimer, the term of this patent is extended or adjusted under 35 U.S.C. 154(b) by 372 days.

(21) Appl. No.: 15/976,825

(22) Filed: May 10, 2018

(65) Prior Publication Data

US 2018/0325343 A1 Nov. 15, 2018

Related U.S. Application Data

(60) Provisional application No. 62/504,791, filed on May 11, 2017.

(51) Int. Cl.

| | |
|---|---|
| *A47L 13/08* | (2006.01) |
| *A47L 13/11* | (2006.01) |
| *B08B 1/00* | (2006.01) |
| *B60S 3/04* | (2006.01) |
| *A47L 25/00* | (2006.01) |

(52) U.S. Cl.
CPC ............... *A47L 13/08* (2013.01); *A47L 13/11* (2013.01); *A47L 25/00* (2013.01); *B08B 1/00* (2013.01); *B60S 3/045* (2013.01)

(58) Field of Classification Search
CPC ...... A47L 13/08; A47L 13/12; A46B 15/0081
See application file for complete search history.

(56) References Cited

U.S. PATENT DOCUMENTS

| | | | | |
|---|---|---|---|---|
| 4,908,900 | A * | 3/1990 | McLaughlin | A47L 1/06 15/105 |
| 6,032,321 | A * | 3/2000 | Shirey | B25G 1/02 15/144.1 |
| 6,804,853 | B2 * | 10/2004 | Wang | A47L 13/258 15/105 |
| 7,343,637 | B2 * | 3/2008 | Lafleur | A46B 7/04 15/105 |
| 9,345,314 | B2 * | 5/2016 | Henningsen | A46B 5/005 |
| 2009/0183330 | A1 * | 7/2009 | Jiang | B25G 1/04 15/144.4 |

\* cited by examiner

*Primary Examiner* — Michael D Jennings
(74) *Attorney, Agent, or Firm* — Maymanat S. Afshar

(57) ABSTRACT

A water extraction device includes a flexible plastic rod, an absorbent blade, and an elongated handle. The device removes water/liquid from automobile compartments such as mirrors after an automobile wash. The device further prevents streaking on the body of automobiles after an automobile starts moving post wash.

20 Claims, 5 Drawing Sheets

WATER EXTRACTION AND DRYING DEVICE FOR AUTOMOBILE COMPONENTS

CROSS-REFERENCE TO RELATED APPLICATIONS

This application claims the benefit of U.S. Provisional Application No. 62/504,791, filed on May 11, 2017, which is incorporated by reference in its entirety.

FIELD OF THE INVENTION

The present invention is directed to a water extraction device for automobile components. In particular, the present invention is directed to a novel water extraction and drying device for automobile side mirrors and other areas in automobiles that are difficult to reach. More particularly, the present invention prevents streaking of water, or any rinsing liquid, on the windows and other body components of automobile such as cars, SUVs, vans, trucks, and motorcycles, following an automobile wash. In addition, the present invention is directed to methods for extracting water from automobile components through use of the present device.

BACKGROUND OF THE INVENTION

The following description includes information that may be useful in understanding the present invention. It is not an admission that any of the information provided herein is prior art or relevant to the present invention, or that any publication specifically or implicitly referenced is prior art. Any publications cited in this description are incorporated by reference herein. Where a definition or use of a term in an incorporated reference is inconsistent or contrary to the definition of that term provided herein, the definition of that term provided herein applies and the definition of that term in the reference does not apply.

Washing automobiles is a routine activity for automobile owners. Whether the automobile is a personal vehicle, an SUV (sport utility vehicle), a van, a truck, or even a motorcycle, water or any liquid used during the washing process is often retained in side mirrors or other components on the vehicle. In particular, the water/liquid may be trapped in the cavities or other recessed (and thus difficult to reach) areas of such mirrors or components. One of the main problems facing automobile owners is the movement of the retained water in side mirrors upon driving, whereby retained water streaks down from such mirrors and is deposited on the windows and the body of the automobile. The retained water is more problematic when the water is hard water (i.e., has high mineral content) and, upon drying on the window or the body of the automobile, leaves a residue that is difficult to remove.

Accordingly, there is a need for a device and method to solve the aforementioned streaking issue. In particular, there is a need for a device that effectively removes water, or any rinsing liquid, retained in automobile components after washing/rinsing the automobile.

SUMMARY OF THE INVENTION

The present invention provides a device and a method to extract and dry water or any rinsing liquid from automobile components post washing/rinsing the automobiles. In particular, the present invention effectively and easily removes water, or any rinsing liquid, retained in automobile components after washing/rinsing. More particularly, the water extraction device of the present invention prevents streaking of the retained water/liquid on the body of the automobiles. Automobile components comprise side mirrors or any components that are difficult to reach in an automobile. Examples of automobiles include, but are not limited to, cars, SUVs, vans, trucks, or motorcycles.

In one embodiment, the device of the present invention extracts/dries water from difficult to reach places, particularly the side rearview mirrors on automobiles. In a further embodiment, the water removal/extraction is accomplished by inserting the device into the side mirror (i.e., in the space/cavity between the mirror and the casing), and maneuvering the drying device back and forth and side to side until water is extracted/dried. Accordingly, upon movement of an automobile, there will not be any water or liquid to streak down from the side mirrors. In another embodiment, the water extraction device is configured to be used in automobiles with deeper reservoirs in the cavities of mirrors or other components on the automobile exterior that could potentially retain water.

In an embodiment, a water extraction device comprises a flexible rod, an absorbent blade and an elongated handle that comprises a top surface and a bottom surface. In one embodiment, the absorbent blade is removably affixed to said flexible rod, and the top surface of the elongated handle comprises a release slide, a lock button, a locking mechanism, and a spring-loaded latch.

In another embodiment, the flexible rod is attached to said elongated handle by said locking mechanism.

In still another embodiment, the elongated handle comprises two longitudinal sections that are fixedly attached. In an alternative embodiment, the elongated handle comprises two longitudinal sections that are removably attached. In an embodiment, the lock button is configured to lock the angle of the flexible rod. In another embodiment, the release slide and the spring-loaded latch are configured for releasing the flexible rod from the handle of the water extraction device.

In an embodiment, the absorbent blade comprises absorbent material for extracting liquid/water and is selected from the group consisting of a wide absorbent blade, standard absorbent blade, or absorbent thin blade. In yet another embodiment, the elongated handle comprises lightweight plastic or rubber material.

In one embodiment, the absorbent blade comprises cotton Sherpa, hemp, chamois, microfiber, or any combination thereof.

In another embodiment, a water extraction device comprises a flexible rod, an absorbent blade and an elongated handle that comprises a top surface and a bottom surface, wherein the elongated handle comprises two longitudinal sections that are fixedly attached. The absorbent blade is removably affixed to the flexible rod and the top surface of the elongated handle comprises a release slide, a lock button, a locking mechanism, and a spring-loaded latch. In another embodiment, the flexible rod is attached to the elongated handle by the locking mechanism. In one embodiment, the elongated handle comprises two longitudinal sections that are removably attached. In another embodiment, the lock button is configured to lock the angle of the flexible rod.

In an embodiment, the release slide and the spring-loaded latch are configured for releasing the flexible rod from the handle of the water extraction device.

In another embodiment, the absorbent blade comprises absorbent material for extracting liquid/water and is selected from the group consisting of a wide absorbent blade, standard absorbent blade, or absorbent thin blade.

In yet another embodiment, the elongated handle comprises lightweight plastic or rubber material. And in an embodiment, the absorbent blade comprises cotton Sherpa, hemp, chamois, microfiber, or any combination thereof.

In an embodiment, a water extraction device comprises a flexible rod, an absorbent blade, and an elongated handle that comprises a top surface and a bottom surface. The elongated handle comprises two longitudinal sections that are fixedly attached and the absorbent blade is removably affixed to the flexible rod. The top surface of the elongated handle comprises a release slide, a lock button, a locking mechanism, and a spring-loaded latch. And the flexible rod is attached to the elongated handle by the locking mechanism. In an embodiment, the elongated handle comprises two longitudinal sections that are removably attached.

In a further embodiment, the release slide and the spring-loaded latch are configured for releasing the flexible rod from the handle.

Various objects, features, aspects and advantages of the inventive subject matter will become more apparent from the following detailed description of exemplary embodiments, along with the accompanying figures in which like numerals represent like components.

DETAILED DESCRIPTION

A water extraction device for automobile components can be manufactured such that it extracts easily and effectively any water or rinsing liquid accumulated in mirrors, and difficult to reach areas in automobiles following an automobile wash. As used herein, and unless the context dictates otherwise, the term "water extraction device" is intended to include drying device. Therefore, the terms "water extraction device", "extraction device", and "drying device" are used synonymously.

Furthermore, as used herein, and unless the context dictates otherwise, the term "liquid" is intended to include water and rinsing liquid, along with soap that may be present in such liquid. In an embodiment of the present invention, the extraction device is used in different types of automobiles such as cars, trucks, motorcycles and SUVs.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

As used herein, the term "about" in conjunction with a numeral refers to a range of that numeral starting from 10% below the absolute of the numeral to 10% above the absolute of the numeral, inclusive.

Figure 2:
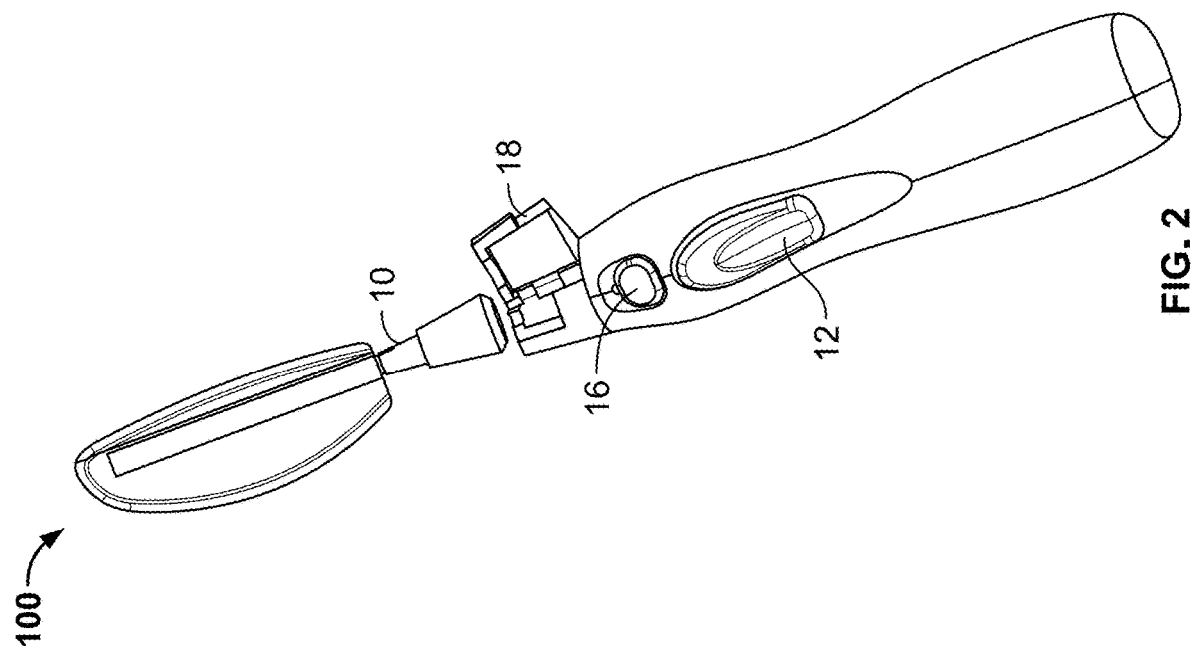
FIG. 2 is an exemplary configuration of a water extraction device according to the present invention, which depicts a top angled view and connection of the flexible rod into the handle of the device.
Figure 1:
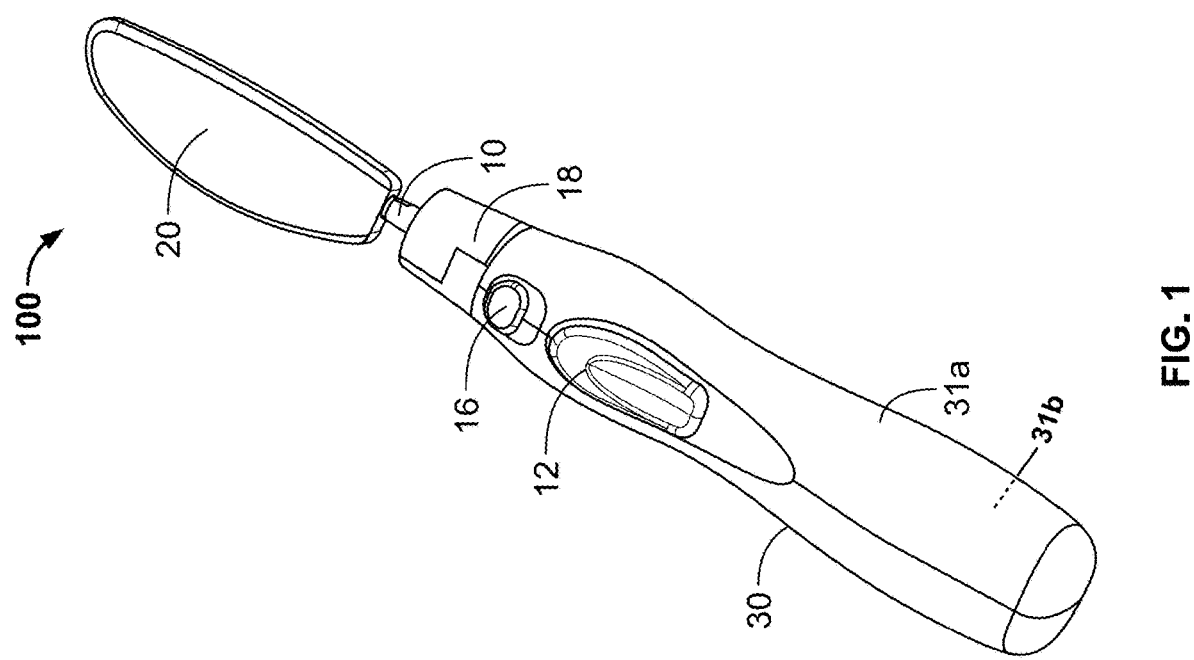
FIG. 1 is an exemplary configuration of a water extraction device according to the present invention, which depicts a top angled view of the device.
Figure 3:
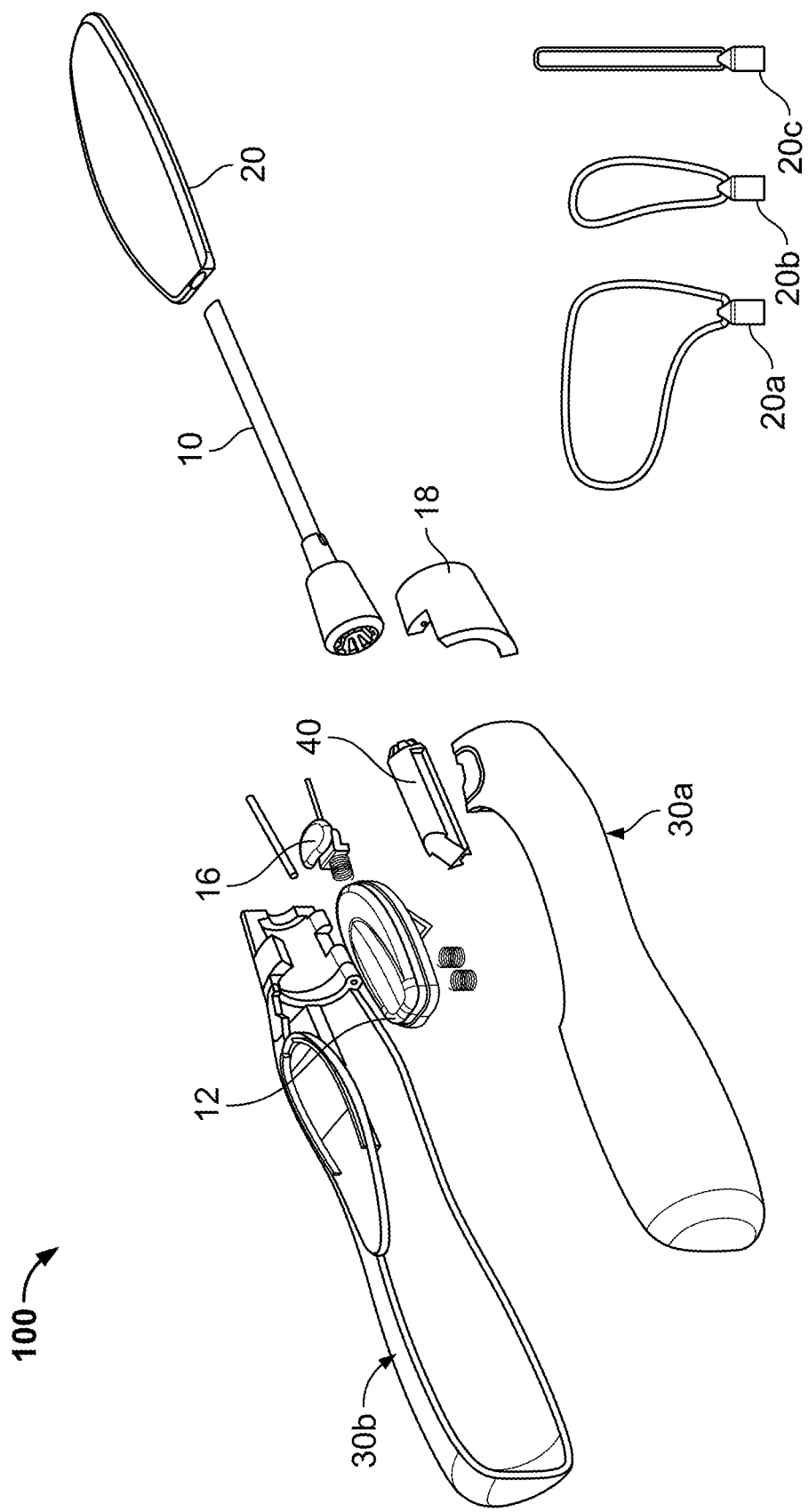
FIG. 3 an exemplary configuration of a water extraction device according to the present invention, which depicts several exemplary components of the water extraction device.
Figure 4:
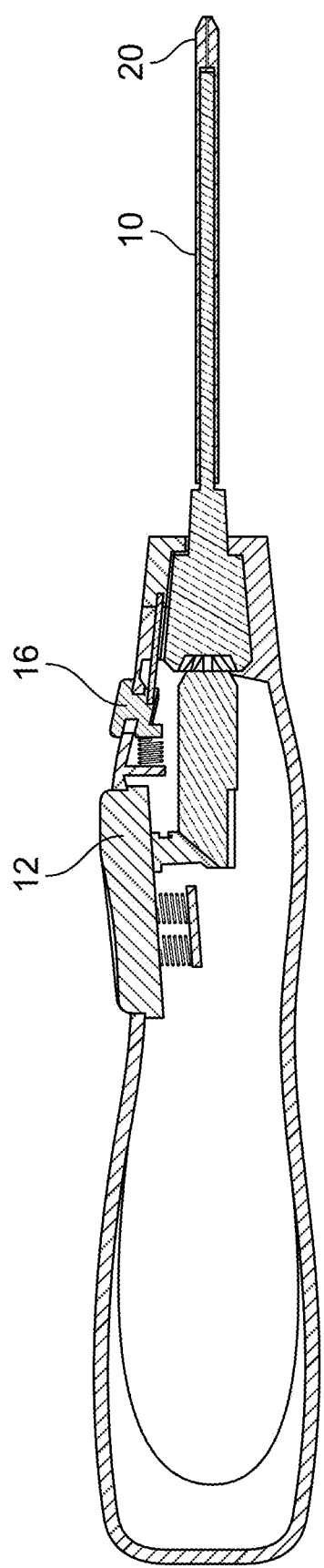
FIG. 4 is an exemplary configuration of a water extraction device according to the present invention, which depicts the cross-section interior of a water extraction device.
Figure 4A:
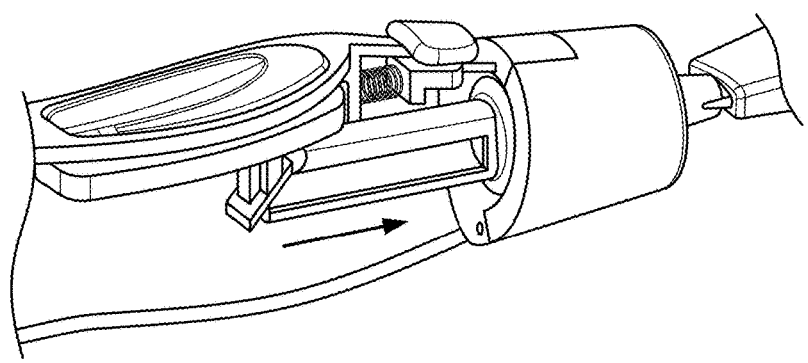
FIG. 4A is an exemplary configuration of a water extraction device according to the present invention, which depicts the interior and operation of some of the components of the water extraction device.
Figure 4B:
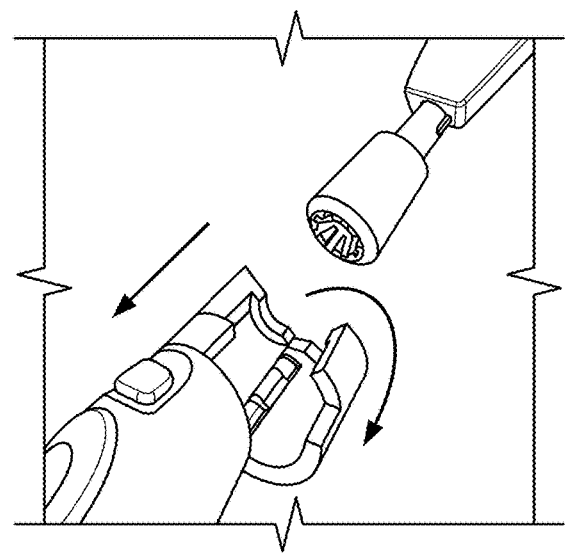
FIG. 4B is an exemplary configuration of a water extraction device according to the present invention, which depicts the interior and operation of some exemplary components of the water extraction device.
Figure 4C:
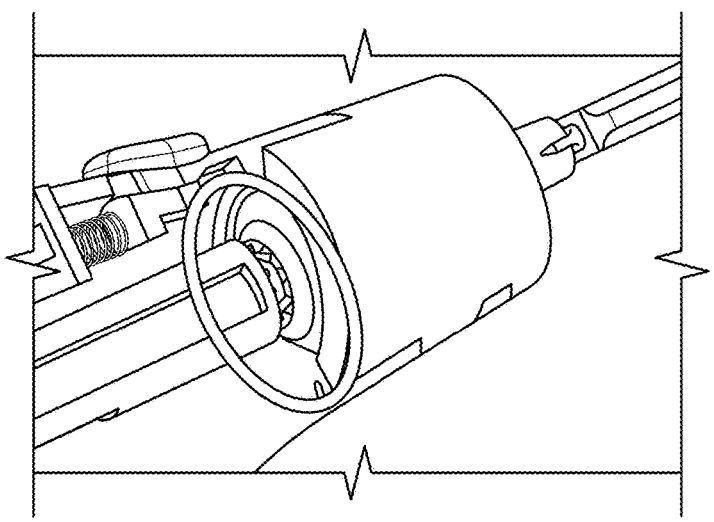
FIG. 4C is an exemplary configuration of a water extraction device according to the present invention, which depicts the interior and operation of some exemplary components of the water extraction device.
Figure 5:
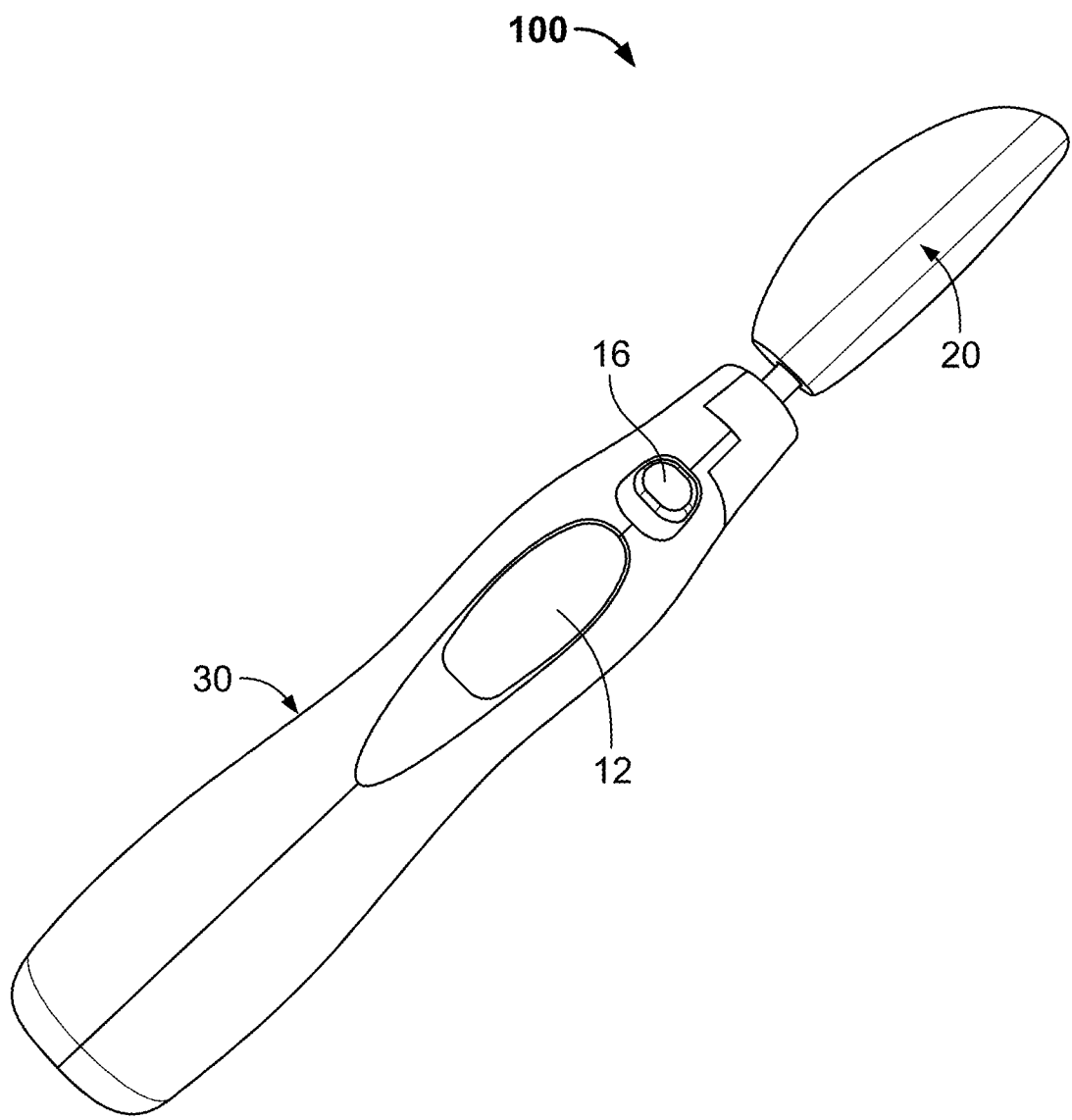
FIG. 5 is an exemplary configuration of a water extraction device according to the present invention, which depicts a top angled view of the device.

Exemplary configurations of one embodiment of the present invention are schematically depicted in FIGS. 1 to 4, 4A to 4C, and 5, in which water extraction device 100 is designed and adapted for use in connection with any type of automobile (not shown). In one embodiment, extraction device 100 includes flexible rod 10, absorbent blade 20, elongated handle 30 comprising a top surface 31a and a bottom surface 31b. In one embodiment, elongated handle 30 comprises two longitudinal sections 30a and 30b that are fixedly attached and configured to have an ergonomic design to provide a user to control water extraction device 100. In another embodiment, two longitudinal sections 30a and 30b are removably attached and are configured to have an ergonomic design to provide a user to control water extraction device 100.

In an embodiment, top surface 31a of elongated handle 30 comprises release slide 16, lock button 12, locking mechanism 40, and spring-loaded latch 18. In an embodiment, release slide 16 and spring-loaded latch 18 are configured to assist with releasing flexible rod 10 from handle 30 (see FIG. 4B). In this embodiment, a user presses to move release slide 16 backwards which removes a pin from spring loaded latch 18, causing to open the spring-loaded latch 18, thus allowing flexible rod 10 to be released from device 100.

In an embodiment, lock button 12 is configured to lock the angle of device 100 while used by a user. In another embodiment, a slide lock instead of lock button 12 is used. In an embodiment, a user pushes and holds down lock button 12 which presses locking mechanism 40 forward into flexible rod 10 to stop flexible rod 10 from spinning, thus locking the angle of device 100 (see FIG. 4A). Accordingly, this feature provides a user with the ability to reach any area difficult to reach in the side mirror. In one embodiment, lock button 12, locking mechanism 40 and spring-loaded latch 18 each independently comprise aluminum or rigid plastic material. In an embodiment, a grooved mating feature allows rotating blade 20 to come to a stop position (see FIG. 4C).

In one embodiment, absorbent blade 20 comprises absorbent material for extracting liquid/water. In another embodiment (see FIG. 3), absorbent blade 20 may also comprise a wide absorbent blade 20a, standard absorbent blade 20b, or absorbent thin blade 20c. Absorbent blades 20a, 20b, and 20c are interchangeable to provide a user with the most suitable blade for any type of vehicle. In another embodiment, absorbent blade 20a, 20b, or 20c comprises cotton Sherpa, hemp, chamois, microfiber, or any combination thereof. A skilled person in the art will be readily able to select a suitable material of construction for absorbent material of absorbent blade 20 based on the operating conditions and requirements in the configurations contemplated herein.

In one exemplary embodiment, absorbent blade 20 is removably affixed to flexible rod 10. In another embodiment, absorbent blade 20 is permanently affixed to flexible rod 10 by adhesive material such as epoxy, polyurethane, fabric glue, or other suitable adhesive material.

In one embodiment, flexible rod 10 comprises plastic, low friction plastic, rubberized material, or any combination thereof.

In an exemplary embodiment, flexible rod 10 is attached to elongated handle 30 by appropriate methods and such methods common in the state of the art, such as a locking mechanism 40. For example, flexible rod 10 is locked into elongated handle 30 by pushing release slide 16 in a forward motion (not shown). In another embodiment, flexible rod 10 is released from elongated handle 30 by sliding back release slide 16 thereby unhinging spring-loaded latch 18, allowing a user to change absorbent blade 20 (see FIG. 4A). In an embodiment, flexible rod 10 may rotate freely within handle 30 unless locked in place by lock button 12 (see FIG. 4A).

In an exemplary embodiment, elongated handle 30 is manufactured from lightweight plastic or rubber material. Material of construction for handle 30 includes, but is not limited to, polypropylene, polycarbonate, acrylic, and any combination thereof. A skilled person in the art will be readily able to select a suitable material of construction for elongated handle 30 based on the operating conditions and requirements in the configurations contemplated herein.

In another embodiment, elongated handle 30 is configured to provide easy maneuvering of water extraction device 100. For example, elongated handle 30 is about 5.5 inches to about 8 inches long and has a diameter of about 1 inch to about 4.5 inches. In an embodiment, flexible rod 10 is configured to provide easy access to automobile components. For example, flexible rod 10 is about 3.5 inches to about 6 inches long and has a diameter of about 0.2 inches to about 1.2 inches. One of ordinary skill in the art can envision other dimensions which may vary with the type of automobile components but not detract from the spirit of the invention. In one or more embodiments, absorbent blade 20 comprises sizes that are sufficient to cover flexible rod 10 completely. For example, absorbent blade 20 is about 0.3 inches to about 2.5 inches wide and about 2.5 inches to about 4.5 inches long.

In one embodiment, flexible rod 10 is configured to be bent in order to access the inner contour of a mirror well. In another embodiment, flexible rod 10 may be free spinning, allowing water extraction device 100 to gently glide along the curvature of the mirror and is configured to be locked by pushing and holding down luck button 12 to prevent rotation and lock in the angle of the water extraction device 100 for a vigorous motion (see FIG. 4A). In one embodiment, a user inserts absorbent blade 20 into the side mirror reservoir (i.e., the space between the mirror and casing) of an automobile (post wash) to absorb any water/liquid that is trapped within the crevice located between the side mirror and mirror well, and maneuvering elongated handle 30 and flexible rod 10 back and forth and side to side until all the water/liquid is absorbed upon contacting absorbent material of blades 20a, 20b, or 20c of absorbent blade 20, thereby extracting any liquid remaining after an automobile wash. Accordingly, upon movement of an automobile, any streaking of water/liquid on the automobile is eliminated.

Thus, specific embodiments of a water extraction and drying device for automobile components and methods to employ such cover have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A water extraction device comprising:
   (a) a flexible rod;
   (b) an absorbent blade; and
   (c) an elongated handle comprising a top surface and a bottom surface;
   wherein said absorbent blade is removably affixed to said flexible rod; and
   wherein said top surface of said elongated handle comprises a release slide, a lock button, a locking mechanism, and a spring-loaded latch.

2. The device of claim 1, wherein said flexible rod is attached to said elongated handle by said locking mechanism.

3. The device according to claim 1, wherein said elongated handle comprises two longitudinal sections that are fixedly attached.

4. The device according to claim 1, wherein said elongated handle comprises two longitudinal sections that are removably attached.

5. The device of claim 1, wherein said lock button is configured to lock the angle of said flexible rod.

6. The device of claim 1, wherein said release slide and said spring loaded latch are configured for releasing said flexible rod from said handle.

7. The device of claim 1, wherein said absorbent blade comprises absorbent material for extracting liquid/water and is selected from the group consisting of a wide absorbent blade, standard absorbent blade, or absorbent thin blade.

8. The device of claim 1, wherein said elongated handle comprises lightweight plastic or rubber material.

9. The device of claim 1, wherein said absorbent blade comprises cotton Sherpa, hemp, chamois, microfiber, or any combination thereof.

10. A water extraction device comprising:
    (a) a flexible rod;
    (b) an absorbent blade; and
    (c) an elongated handle comprising a top surface and a bottom surface;
    wherein said elongated handle comprises two longitudinal sections that are fixedly attached;
    wherein said absorbent blade is removably affixed to said flexible rod; and
    wherein said top surface of said elongated handle comprises a release slide, a lock button, a locking mechanism, and a spring-loaded latch.

11. The device of claim 10, wherein said flexible rod is attached to said elongated handle by said locking mechanism.

12. The device according to claim 10, wherein said elongated handle comprises two longitudinal sections that are removably attached.

13. The device of claim 10, wherein said lock button is configured to lock the angle of said flexible rod.

14. The device of claim 10, wherein said release slide and spring loaded latch are configured for releasing said flexible rod from said handle.

15. The device of claim 10, wherein said absorbent blade comprises absorbent material for extracting liquid/water and is selected from the group consisting of a wide absorbent blade, standard absorbent blade, or absorbent thin blade.

16. The device of claim 10, wherein said elongated handle comprises lightweight plastic or rubber material.

17. The device of claim 10, wherein said absorbent blade comprises cotton Sherpa, hemp, chamois, microfiber, or any combination thereof.

18. A water extraction device comprising:
   (a) a flexible rod;
   (b) an absorbent blade; and
   (c) an elongated handle comprising a top surface and a bottom surface;
   wherein said elongated handle comprises two longitudinal sections that are fixedly attached;
   wherein said absorbent blade is removably affixed to said flexible rod; and
   wherein said top surface of said elongated handle comprises a release slide, a lock button, a locking mechanism, and a spring-loaded latch; and
   wherein said flexible rod is attached to said elongated handle by said locking mechanism.

19. The device according to claim 18, wherein said elongated handle comprises two longitudinal sections that are removably attached.

20. The device according to claim 18, wherein said release slide and said spring loaded latch are configured for releasing said flexible rod from said handle.

* * * * *